United States Patent [19]

Huizer

[11] 4,106,585
[45] Aug. 15, 1978

[54] AIR GUN FIRING CONTROL

[75] Inventor: Willem Huizer, Rijswijk, Netherlands

[73] Assignee: Shell Oil Company, Houston, Tex.

[21] Appl. No.: 762,216

[22] Filed: Jan. 24, 1977

[30] Foreign Application Priority Data

Feb. 5, 1976 [GB] United Kingdom ............... 4576/76

[51] Int. Cl.² .................................................. G01V 1/08
[52] U.S. Cl. ................................. 181/107; 181/119; 181/120
[58] Field of Search ................ 181/107, 119, 120

[56] References Cited

U.S. PATENT DOCUMENTS

| | | | |
|---|---|---|---|
| 3,638,752 | 2/1972 | Wakefield | 181/120 |
| 3,687,218 | 9/1972 | Ritter | 181/107 |
| 3,985,199 | 10/1976 | Baird | 181/107 |
| 4,034,827 | 7/1977 | Leerskov, Jr. et al | 181/107 |
| 4,047,591 | 9/1977 | Ward et al. | 181/107 |

Primary Examiner—Howard A. Birmiel

[57] ABSTRACT

A method and apparatus for controlling the firing of a seismic source, wherein the firing circuit is coupled to the source by a two-conductor cable whose impedence is changed upon firing of the source. The change in cable impedance is detected and the time delay between the firing command signal and the detected change is used to control the firing command signal in order that a plurality of sources may be fired in a desired sequence.

5 Claims, 9 Drawing Figures

AIR GUN FIRING CONTROL

BACKGROUND OF THE INVENTION

The present invention relates to an apparatus for controlling the moment of firing a seismic source. Such source may be any acoustic source that is adapted to be fired on land, underwater, in the air, or even in solid rock. Air guns, gas exploders and steam guns are examples of such source.

The invention relates, in particular, to an apparatus for controlling the moment of firing a seismic source adapted to create a seismic pulse upon actuation by means forming part of an electric system comprising an electric source, a two-conductor electric cable connecting the electric source with the actuating means, electric switch means for controlling the electric connection between the electric source and the cable, and means for operating the switch means a predetermined period after a command signal has been supplied thereto.

In operating seismic sources of the above type, time delays are found between the operation of the switch means and the moment of appearance of the seismic pulse, which delays vary in length for seismic sources of different design, and even for seismic sources of the same design. Further, such delays are found to vary over the time for each individual seismic source.

It will be appreciated that delays of non-constant value cannot be tolerated when operating a plurality of seismic sources simultaneously as is often done for increasing the energy and/or the quality of the seismic pulse needed in a seismic operation, or when applying wave-generating techniques which require the firing of a limited number of sources at a very small, fixed time delay (in the order of 1–100 milliseconds) with respect to the firing of the other sources.

It will be appreciated that since each individual seismic source shows in operation a specific delay period extending between the moment of the seismic pulse generated thereby and the moment that the switch means that operates the actuating means is closed, adjustable time delay means are provided to control the operations of the switches of the various sources in a manner such that the pulses will occur at exactly the same moment or (if such would be required) with adjustable, predetermined time intervals therebetween.

To measure the specific delay period of each source in underwater operations, use has been made of hydrophones to pick up signals of the individual seismic pulses, which signals are fed by separate cables to the vessel from which the firing signal is given. Each hydrophone is arranged close to a seismic source, and by separately firing the sources, the specific delay period of each source can be determined from time to time. It will, however, be appreciated that separately firing of the sources is a time-consuming operation. Also, the number of electric conductors in the cable connecting the sources to the shooting vessel is doubled (since each source as well as the corresponding hydrophone needs a separate pair of conductors) which requires the use of a cable that is expensive, and moreover, difficult to handle in view of the diameter thereof.

BRIEF SUMMARY OF THE INVENTION

An object of the invention is a fire control apparatus for a seismic source which does not show the above drawbacks.

According to the invention, the fire control apparatus comprises:
  means adapted to be operatively coupled to the seismic source and adapted to influence an electric property of the electric system upon detection of a physical change of the seismic source or in the seismic source, which physical change accompanies the generation of a seismic pulse;
  means for determining a change of value of said electric property of the electric system;
  means for determining the length of the time period extending between the command signal and the said change of value of the electric property; and
  means for adjusting the length of said predetermined time period in relation to the length of the time period between the command signal and the said change of value of the electric property.

The invention is based on the use of measuring equipment that can provide a signal having a constant time relationship with a seismic pulse originating from a single seismic source when fired in combination with other sources, without picking up thereby signals that are related to the seismic pulses originating from these other sources. The invention is further based on the use of the two-conductor electric cable, that is required for firing each source, as a signal line for relaying to the shooting vessel the signal having a constant time relationship with the seismic pulse generated by the relevant source.

The above-referred signal that has a constant time relationship with a pulse generated by a source is obtained by means of equipment designed for detecting a physical change of or in such seismic source. Such physical change may e.g. be related to the acceleration of the source (or of a component of the source, such as a housing or a valve), or to the magnitude of a gas pressure in the source. For each type of source, such phenomenon has a constant time relationship with the moment at which the generated seismic pulse has its maximum amplitude, which time relationship is the same for all sources of the same type. Therefore, when it is desired to have coinciding peak values of seismic pulses originating from a plurality of sources, the lengths of the adjustable time periods extending between the command signal and the operation of the switch means should be controlled individually in a manner such that the physical change of (or in) each seismic source occurs at exactly the same moment as the corresponding physical changes of the other sources.

The above-referred measuring means are operatively coupled to means adapted to influence an electric property of the electric system. Such means may consist of electric (or electronic) switch means that are electrically coupled to the actuating means of the seismic source. These switch means can be coupled in parallel or in series with the electric inputs of the actuating means (if desired, in combination with an electric resistance). It will be appreciated that operation of the switch means will change the value of an electric property (such as the impedance of the electric system). By now detecting said change and measuring the period of time lapsed between the command signal applied for, operating the actuating means of the source and the occurrence of said change (which has a constant time relationship with the seismic pulse), an indication will be obtained of the delay period of the actuating means. This delay period being different for the various sources of a common design, individual compensations have to be introduced to adjust the time periods extending between the command signal and the operation of the switch means of the various sources in order to reach peak values of the seismic pulses either at exactly the same moment or in a controlled sequence at controlled time intervals. These compensations are related to the measured lengths of time periods between the command signal and the change of value measured of an electric property of the electric system of each source. By "command signal" is meant the signal that is used to initiate firing of a seismic source or a plurality of seismic sources.

BRIEF DESCRIPTION OF THE DRAWINGS

The invention will be described by way of example in more detail with reference to the drawing.

PREFERRED EMBODIMENT

Figure 1:
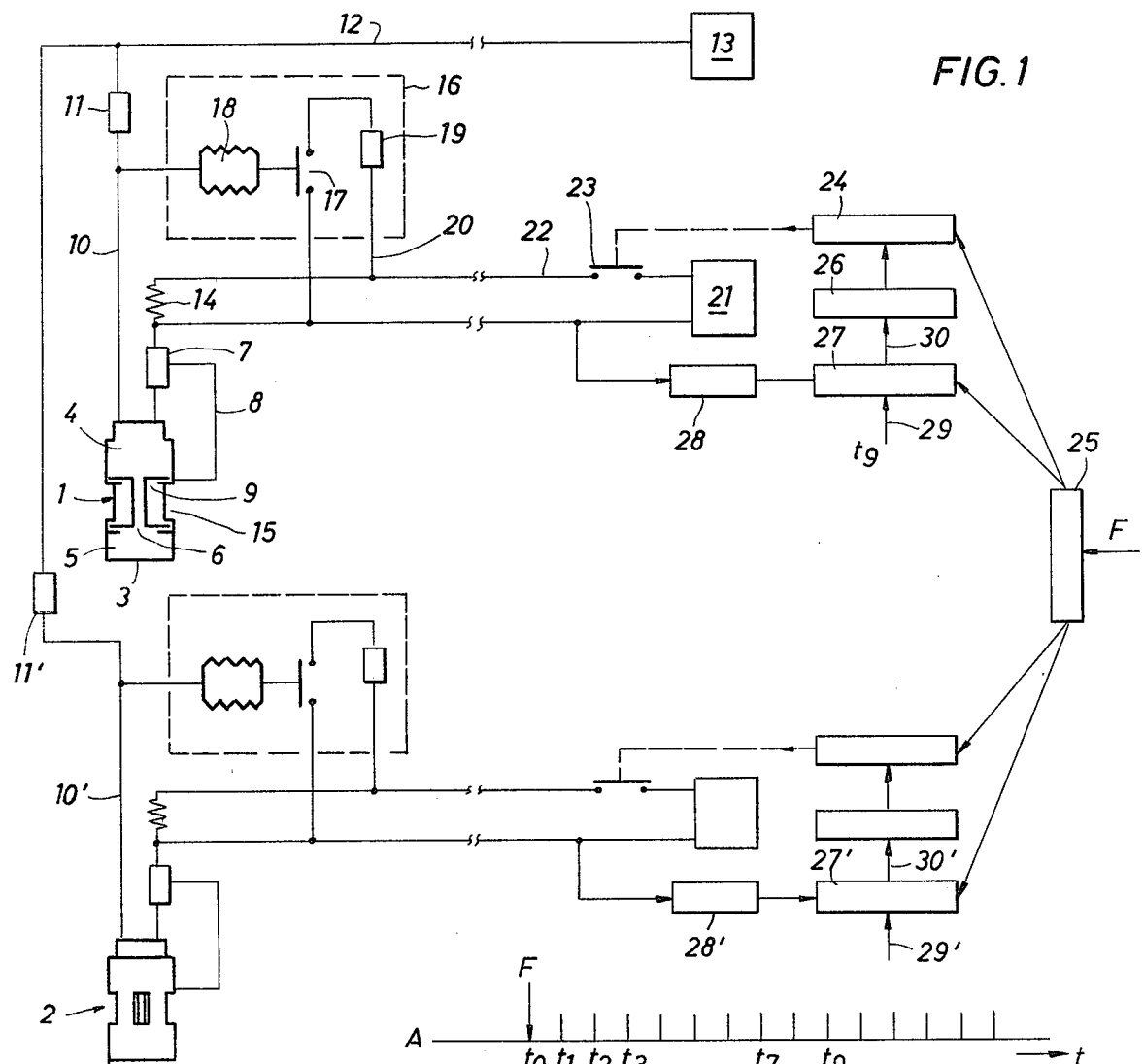
FIG. 1 of the drawing shows, schematically, a seismic array consisting of two air guns and the electric systems that are applied, according to the invention, to control the firing moments of the individual guns.

The air guns 1 and 2, shown in FIG. 1, are of the same type. By way of example, a type of air gun known under the trademark "Bolt," is applied. No details of such gun are given since these are known to the expert. However, the principle of this type of air gun will be described in so far as required for understanding the invention.

Each gun comprises a housing 3, with upper or control air chamber 4 and lower or firing air chamber 5. A valve 6 (hereinafter referred to as shuttle valve) cooperates with the housing 3, and in the position shown, prevents a volume of high-pressure air to escape from the chambers 4 and 5 of the housing 3. The solenoid valve 7 controls the passage through a conduit 8, linking the top of the upper chamber 4 with a location under the upper seat 9 of the shuttle valve 6. The top end of each upper chamber 4 of the air guns 1 and 2 communicates via conduit 10 (10'), having an air filter 11 (11') incorporated therein, via a main conduit 12 with a source 13 of pressurized air.

High-pressure air flows freely from source 13 through conduits 12, 10 and 10' into the upper chambers 4 of the air guns 1 and 2, and through the interior passages of the shuttle valves 6 thereof into the lower chambers 5. Opening of the solenoid valve 7 of a gun, by electrically activating the solenoid 14 cooperating with valve 7, puts high-pressure air under the upper seat 9 of the shuttle valve 6, thereby causing the shuttle valve 6 to move upwards at very high speed, thus opening the lower chamber 5 and allowing air to flow out through ports 15 to form a bubble of high-pressure air in the water surrounding the air gun. After the air has been released, fresh high-pressure air is supplied via conduit 10 to the upper chamber 4. Shuttle valve 6 will move downwards to the closed position, solenoid valve 7 having been closed in the meantime.

It has been found that the air pressure in upper chamber 4 of an air gun is related to the displacement of the shuttle valve 6 with respect to the housing 3 of the air gun, and consequently, to the momentaneous relative position of the housing and the valve, which position in its turn has a constant time relationship with the formation of the gas bubble, and consequently, with the peak value of the seismic pulse or signal generated thereby. A maximum air pressure has been found to exist in the upper chamber 4 of the air gun when the shuttle valve 6 is at the end of its upward stroke.

The measuring means 16 is used to measure the pressure within the upper air chamber 4 of the source 1. This measuring means comprises a switch 17 that is closed when a fast rise in pressure is detected by the bellows 18, in order to couple electric resistance 19 via cable 20 in parallel to the inputs of the solenoid 14. The solenoid 14 is actuated by supplying electric energy thereto from an electric energy source 21 (which may consist of one or more condensers that are being charged periodically) via a two-conductor electric cable 22. The supply of energy to the solenoid 14 is controlled by an electric (or electronic) switch 23. It is observed that the bellows 18 is not in direct communication with the upper chamber 4, but communicates with the conduit 10. However, since the air conduit 10 is sufficiently large, the pressure prevailing in this conduit is substantially the same as the pressure in the upper chamber 4. It is observed that the filters 11 and 11' prevent an exchange of pressure signals between the conduits 10 and 10'.

The switch 23 is operated by a comparator 24 that compares the signals received from a time code generator 25 with a delay coder 26. When the signals received by comparator 24 are identical, a firing signal is sent to switch 23 to close the switch, and thereby fire the air gun 1.

Figure 2:
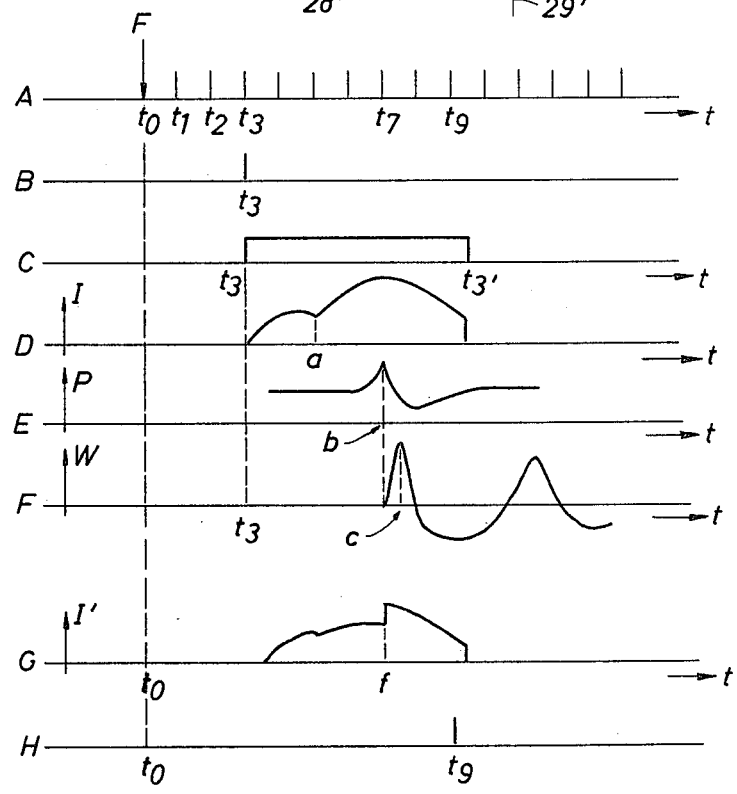
FIG. 2A shows a time diagram of the time code generator 25 in FIG. 1.
FIG. 2B shows the setting of the delay coder 26 in FIG. 1.
FIG. 2C shows a time diagram of the operation of switch means 23 in FIG. 1.
FIG. 2D shows the variation of current I in cable 22 over the time $t$ (in case the measuring equipment 16 would be disconnected from cable 22 in FIG. 1).
FIG. 2E shows the variation of pressure P in air gun 1 over the time $t$.
FIG. 2F shows the amplitude W of the seismic wave, generated by the air gun 1 over the time $t$.
FIG. 2G shows the variation of the current I in cable 22 over the time $t$.
FIG. 2H shows the setting of the delay coder 26 at code $t_9$.

The delay coder 26 is adjustable, and the influence of such adjustments will hereinafter be explained with reference of FIG. 2 of the drawings which shows several diagrams of signals that are being applied in the system of FIG. 1.

The time code generator 25 starts to generate signals $t_1, t_2 \ldots$ etc., at extremely small, constant time intervals (say in the range 0.1–1 millisecond), after being activated by a command signal F at time $t_0$ (see FIG. 2A).

The delay coder 26 is coded with code $t_3$, which code is identical to the signal generated by the time code generator at time $t_3$ (see FIG. 2B). The comparator 24, on detecting these identical signals at time $t_3$, emits a signal to the switch 23 over the period $t_3 - t_3'$ (see FIG. 2C), which results in an electric current I flowing through the cable 22 to the solenoid 14 (see FIG. 2D, wherein point "$a$" indicates the moment at which the solenoid is fully retracted). It is observed that the relationship between current I and time $t$, shown in FIG. 2D, is on the assumption that measuring means 16 is absent. Opening of the solenoid valve 7 results in an unbalance of shuttle valve 6, which moves upwards, and is stopped at the end of this displacement by an air cushion in the top of the upper chamber 4 of the housing 3 of the air gun, thereby creating a maximum air pressure at time "$b$" (see FIG. 2E). The air escaping from the housing 3 of the air gun to surrounding water creates a pressure wave, having an amplitude W/time $t$, relation, shown in FIG. 2F.

To adjust the delay coders of the two guns 1 and 2 automatically, such that the maximum amplitude of the seismic pulses thereof will occur at exactly the same moment, use is made of a second comparator for each gun. This second comparator 27, 27' receives time code signals from the time code generator 25, a signal from the detector 28, 28', and a set value by supplying an input code at input 29, 29', thereby generating from these signals an output signal 30 (30') to adjust delay coder 26, 26'.

It is observed that the detector 28 measures an electric property (such as current or impedance) of the electric system incorporating the solenoid 14, the switch 17, the resistance 19, the cable 20, the two-conductor cable 22, the switch means 23, and the source 21.

It will be appreciated that the closing of the switch 17 of measuring element 16, when this element measures a maximum value of the pressure in the air gun 1 (or in the conduit 10 communicating therewith), will result in a change in the impedance at the left end of the cable 22 since resistance 19 is then coupled in parallel to windings of solenoid 14. This results in a peak value of the current I' (see FIG. 2G) at time $f$. The moment at which this peak value occurs is detected by detector 28 and compared with the set value of the comparator 27 which, in the present example, has been given the value $t_9$ (see FIG. 2H). At time code $t_9$, the signal supplied by time code generator 25 is identical to the preset value $t_9$, and the comparator 27 will then measure the time interval $f-t_9$. In the example, this time interval has a length of two time units, and the comparator 27 will then adjust the delay unit 26 from signal code $t_3$ to signal code $t_5$, either directly or stepwise (in small increments), during a time period extending over a predetermined number of subsequent shots (this latter for avoiding control instability). Thereby, all diagrams 2C, 2E, 2F and 2G, shift two time units, thus delaying the maximum wave amplitude W (see FIG. 2F) of the explosion two time units. It will be understood that instead of directly measuring the time interval $f-t_9$, the comparator 27 may also measure the time interval $t_0-t_9$, which latter interval is the preset interval after which the seismic pressure pulse should occur.

The firing control means of air gun 2 are identical to those of air gun 1. Both control means, however, communicate with a single time code generator 25. It will be appreciated that by presetting the input code 29' to the comparator 27' of the firing control means of air gun 2 at the same value as the input code 29 to the comparator 27, the maximum amplitude of the explosions generated by these guns will be at exactly the same time. By setting these input codes at other values, a time difference may be created between the maximum amplitudes of said waves, which may be desirable for suppressing tails of the seismic wave that results from explosions of a plurality of guns. This latter is a known technique which does not require further explanation.

Since the specific circuitry of the time code generator, the comparators, the delay coders, et cetera, as shown in FIG. 1 of the drawing is known per se, no details thereof will be given here. It will be understood that the functions of the time code generator, the comparators, the delay coders, et cetera, may be performed by a computer.

If desired, the bellows 18 in FIG. 1 may be replaced by any other type of pressure-measuring instrument, such as a piezoelectric gas pressure detector, which latter is preferably combined with an electronic switch means to control the passage of electric current through the electric cable 20 (thereby replacing switch means 17).

Instead of monitoring the air pressure in a gun to detect a physical change in the gun that has a constant time relationship with each seismic pulse generated thereby, and using the moment at which such change occurs as a reference for the explosion of the gun, other signals can be applied that have a particular time relationship with the explosion, provided that these signals are chosen such that there is no interference with corresponding signals from other guns that are fired simultaneously (or almost simultaneously) with the first gun. Thus, the bellows 18 of the measuring means 16 may be replaced by an accelerometer that gives a signal at a predetermined (such as the maximum) acceleration of the housing 3. Each value of the acceleration of the Housing 3 corresponds with a particular degree of opening of the shuttle valve 6, and therefore has a certain time relationship with the explosion. Thus, by placing accelerometers on all housings of the air guns that have to be fired in unison, and setting these accelerometers such that they close the switch 17 corresponding therewith at the same value of acceleration, the moments at which the explosions take place can be compared with set values in the comparators (such as 27 and 27') that can adjust the delay coders of the guns to compensate the time differences between the various explosions, either such that they become zero or have a predetermined, fixed value.

It will be appreciated that the accelerometer may also be connected to the shuttle valve of an air gun. However, in view of the problems that are to be faced with relaying the signals from the accelerometer to the electric cable 22, it is preferred to mount these meters on the housings of the guns.

Any other type of measuring equipment that detects the position of the valve with respect to the air gun housing may be used in the fire control means of the invention. As an example, there is mentioned a magnetic pickup means that detects a displacement of a metal body (such as the shuttle valve 6) with respect to a magnetic field (such as an electric coil carried by the housing of the gun 1) and gives off a signal at a certain predetermined relative displacement between the valve and the housing.

It will be understood that although FIG. 1 of the drawing shows application of the invention to two air guns, application of the invention is not limited to use thereof in connection of any array consisting of only two guns. Arrays containing any number of guns of any type may be equipped with individual fire control apparatuses, according to the invention. A single-time code generator is used for synchronizing the individual operations of the various fire control apparatuses.

It will be appreciated that application of the fire control apparatus, according to the invention, is not limited to seismic sources consisting of air guns. Any seismic source that, upon operation, shows the existence of a time delay between the moment at which an actuating signal is supplied to the actuating means thereof, and the moment at which the peak value occurs of the seismic pulse generated thereby, can be equipped with the fire control apparatus, according to the invention, when applied in combination with other sources that are either to be fired simultaneously, or at predetermined time intervals, to form a pulse train. As examples of such other seismic sources, reference is made to gas exploders and the steam gun, which latter is used to supply high-pressure, high-temperature steam to a body of water, whereafter the steam bubble thus formed generates a seismic pulse on implosion thereof.

The seismic source which is controlled by the fire control means of the invention may be used on land, in water, in air, or in rock, such as solid rock, or a mass of granulated rock.

What we claim is:

1. Apparatus for controlling the moment of firing of an air gun, having a control chamber and a firing chamber, said air gun being fired by an electric system comprising an electric source, a two-conductor electric cable connecting the electric source with the actuating means of said air gun, electric switch means for controlling the electric connection between the electric source and the cable, and means for operating the switch means to a predetermined time period after a command signal has been supplied thereto, said apparatus comprising:

means adapted to be operatively coupled to the air gun and adapted to (influence an electrical property) change the electrical impedance across the two conductor cable of the electrical system upon detection of an increase in air pressure in the control chamber that accompanies the generation of a seismic pulse;

means for detecting a change in the value of said electrical impedance (electric property) of the electric system;

means for determining the length of the time period extending between the command signal and the said change of value of the electrical impedance (electric property); and, means for adjusting the length of said predetermined time period in relation to the length of the time period between the command signal and the said change of value of the electrical impedance (electric property).

2. Apparatus, according to claim 1 and in addition, a time code generator, an adjustable delay coder, a comparator for comparing the signals from the time code generator and the delay coder and operatively connected to actuate the electric switch means upon receipt of identical signals from the time coder generator and the adjustable delay coder, and the means for determining the length of the time period extending between the command signal and the change in an electric property of the said electric system comprising a second comparator for comparing the moment of the occurrence of said change with a preset time value, said second comparator being coupled to the detecting means and the time code generator, and being operatively connected to the adjustable delay coder for adjusting this coder in relation to the results of said comparison.

3. Apparatus, according to claim 1, wherein the means adapted to influence the electrical impedance of the electrical system comprises a second electric switch, operatively coupled to the electric cable.

4. The apparatus of claim 1 wherein the means used to control the firing of the air gun comprises a solenoid-actuated valve means and the means for changing the electrical impedence of the electrical system comprises a pressure-actuated switch that is disposed to couple a resistance in parallel with the coil of said solenoid-actuated valve.

5. Method for controlling the moment of firing an air gun having a control chamber and a firing chamber adapted to create a seismic pulse, said method comprising the steps of:

supplying a command signal to the air gun through an adjustable time delay means, and an electric system incorporating a two-conductor electric cable;

changing the electrical impedance across the two conductor cable (influencing an electrical property) of the electric system upon detection of an increase in the pressure in the control chamber, which increase in pressure accompanies the generation of a seismic pulse;

detecting a change of value of said electrical impedance (electric property) of the electric system;

determining the length of the time period extending between the command signal and the said change of value of the electrical impedance (electric property); and, adjusting the time delay means in relation to the length of time period determined in the preceding step.

* * * * *